Dec. 18, 1962  H. N. SHAW  3,068,912
KETTLES
Filed May 11, 1959  4 Sheets-Sheet 1

INVENTOR.
Harold N. Shaw
BY
Roberts, Cushman & Grover
ATT'YS

Dec. 18, 1962  H. N. SHAW  3,068,912
KETTLES

Filed May 11, 1959  4 Sheets-Sheet 2

INVENTOR.
Harold N. Shaw
BY
Roberts, Cushman & Grover
ATT'YS

Dec. 18, 1962 H. N. SHAW 3,068,912
KETTLES
Filed May 11, 1959 4 Sheets-Sheet 3
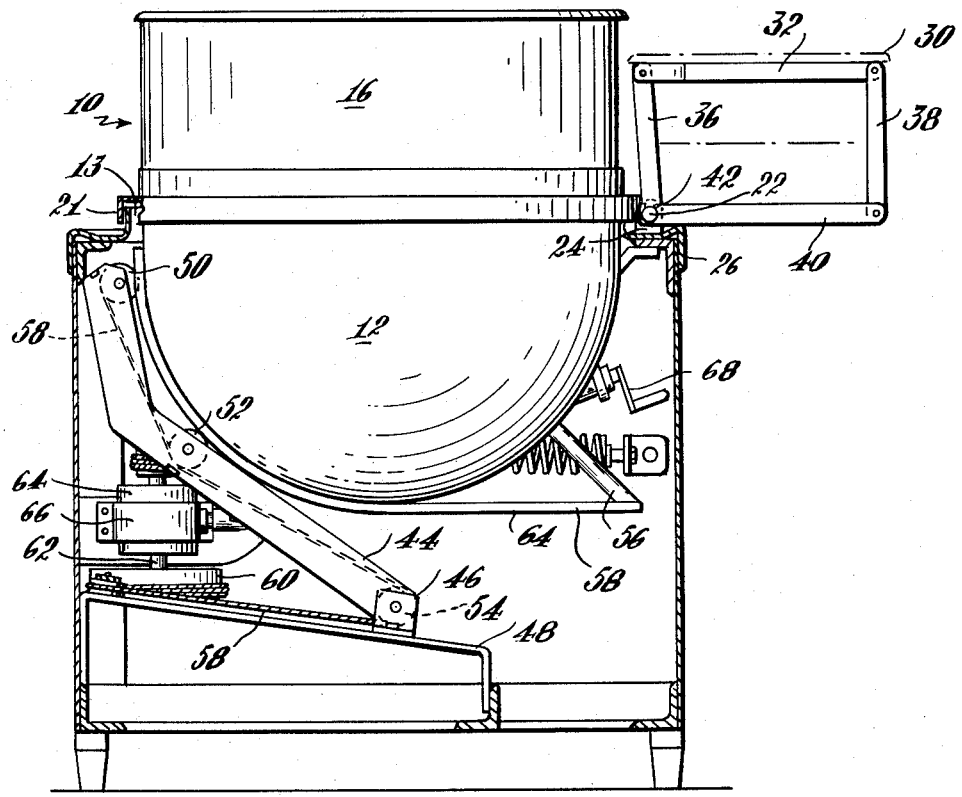
Fig. 3
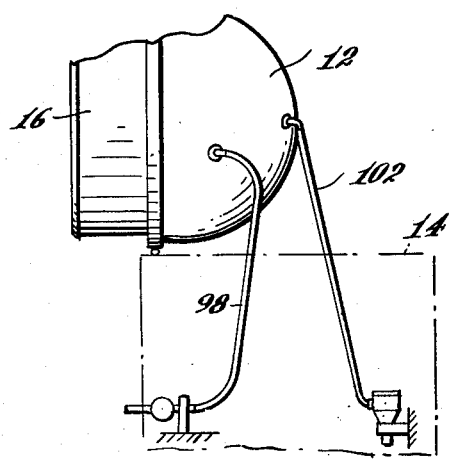
Fig. 6
Fig. 7
INVENTOR.
Harold N. Shaw
BY
Roberts, Cushman & Grover
ATT'YS INVENTOR.
Harold N. Shaw
BY
Roberts, Cushman & Grover
ATT'YS

United States Patent Office 3,068,912
Patented Dec. 18, 1962

3,068,912
KETTLES
Harold N. Shaw, Cambridge, Mass., assignor to Market Forge Company, Everett, Mass., a corporation of Massachusetts
Filed May 11, 1959, Ser. No. 812,501
11 Claims. (Cl. 141—271)

This invention relates to apparatus for preparing food in large quantity and more especially to kettles of the kind which are supported for movement from an upright position, which position the kettle occupies during cooking, to a prone position on one side to discharge the content of the kettle.

Objects of this invention are to provide cooking apparatus of the foregoing kind with improved means for supporting a receptacle adjacent the mouth of the kettle, when the latter is tilted to its prone position for discharge of its content, to receive the content; to provide means for supporting and automatically moving the receptacle in position to receive the content of the kettle as it is tilted to its prone position without spilling and/or dripping; to provide supporting means upon which the receptacle may be mounted and from which it may be dismounted without restoring the kettle to its upright position; to provide improved means for tilting the kettle to a prone position for discharging its content; to provide means for counterbalancing the filled kettle so as to make it easier to tilt for discharge; and to provide apparatus which is durable, attractive and easy to keep clean.

As herein illustrated, the apparatus comprises in combination with a tiltable kettle, a base, means pivotally supporting the kettle on the base for tilting movement from an upright position to a prone position on one side, a tray, and means mounting the tray on the base at the side toward which the kettle is tilted to discharge its content, which is operable to move the tray forwardly and downwardly as the rim of the kettle tilts forwardly and downwardly to its prone position so that the tray will be directly beneath the rim as the kettle is tilted in any position. The mounting means for the tray is in the form of a bracket having spaced parallel arms between which the tray may be slid into position or from which it may be removed without re-elevating the kettle to its upright position. The arms in turn are supported at the upper ends of spaced parallel links, the lower ends of which are pivotally supported by the base. There is means connecting one of the pair of links to the kettle so that tilting movement of the kettle effects a corresponding tilting movement of the links. The kettle is tilted by shortening of a flexible element, one end of which is attached to the bottom of the kettle. A portion of the element extends rearwardly from the point of attachment to the kettle over pulleys mounted on an arm pivoted on the frame below the kettle, the arm being movable upwardly about its pivot, and another portion is wound on a drum, the latter being rotatable to take up and hence shorten the flexible element, thereby to lift the arm and the kettle with it. A heavy spring operates on the drum in a direction to assist in tilting the kettle. Optionally, the kettle may be tilted by a Saginaw screw.

The invention will now be described in greater detail with reference to the accompanying drawings wherein:

FIG. 3 is a side elevation;

FIG. 6 is an elevation to much smaller scale showing the kettle in cooking position with the steam connections thereto, and omitting the support except in outline; and FIG. 7 is a corresponding view showing the kettle tilted to its discharge position.

Figure 1:
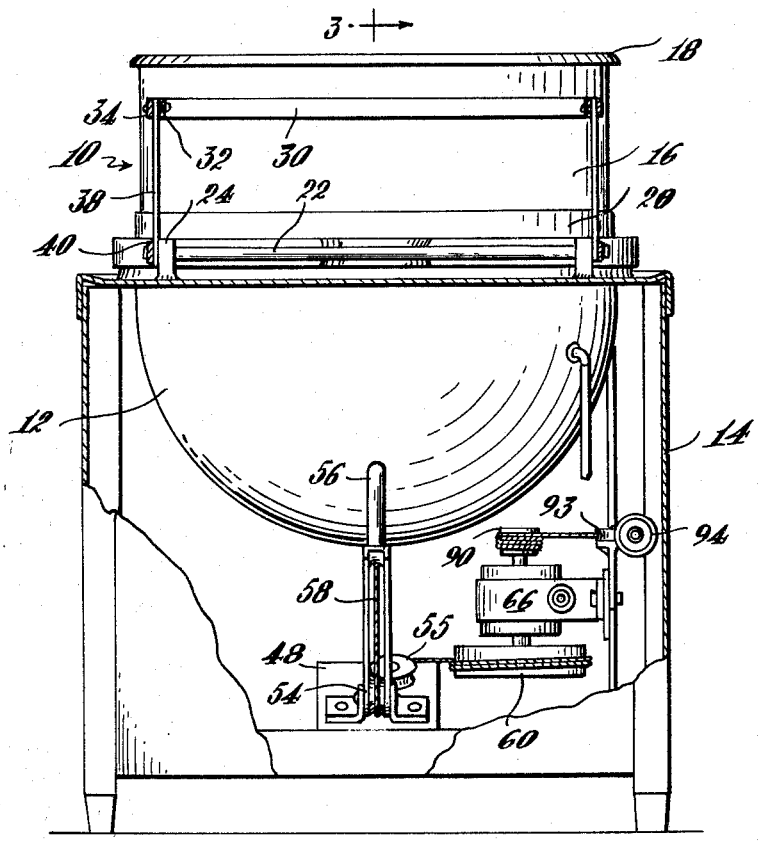
FIG. 1 is a front elevation of the apparatus showing the kettle in its upright cooking position.
Figure 2:
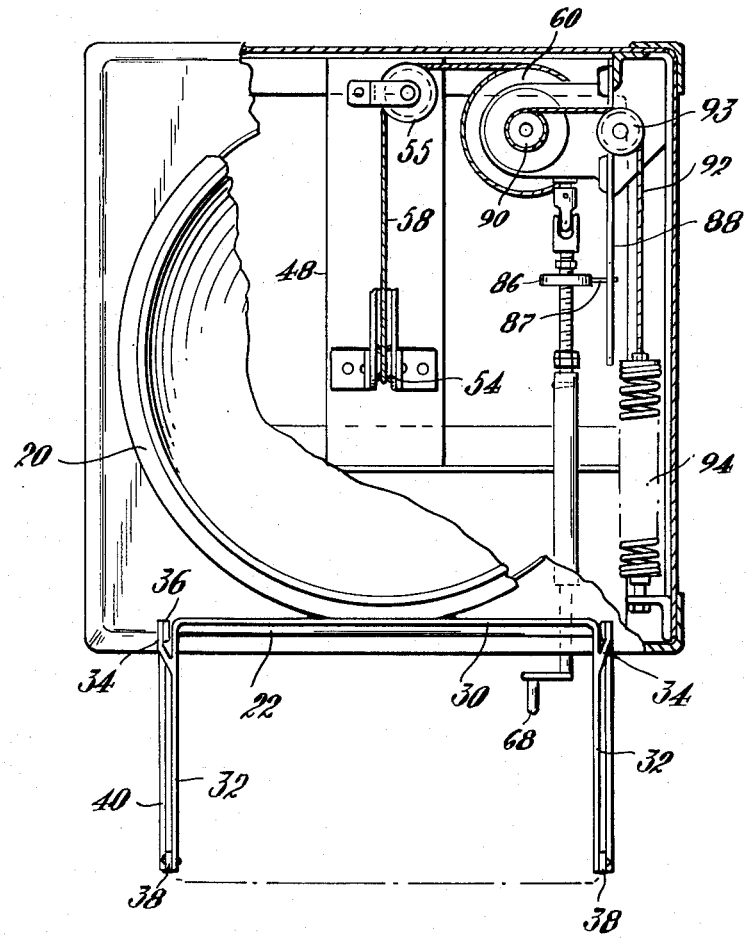
FIG. 2 is a top view.
Figure 4:
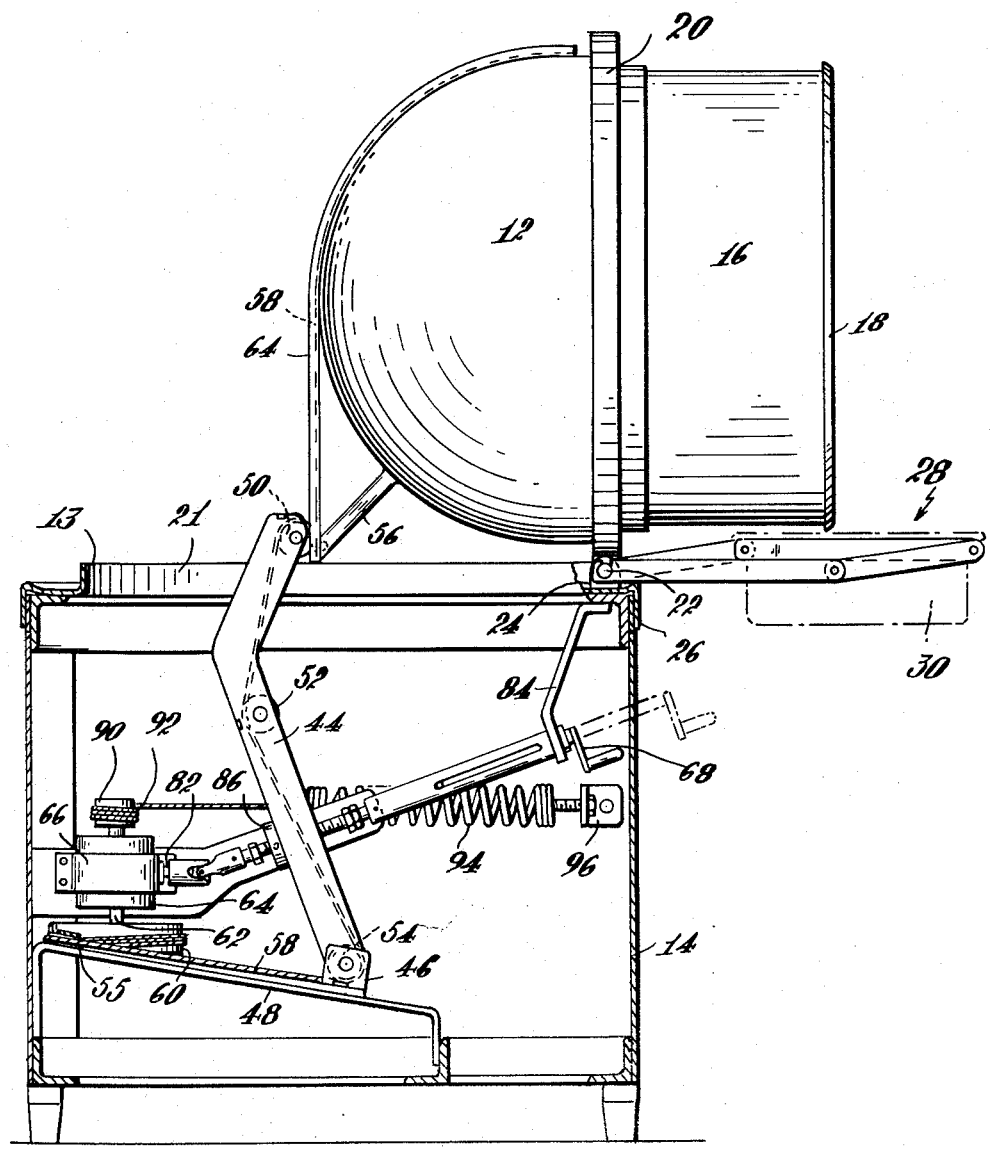
FIG. 4 is a side elevation showing the base in section midway between the sides, and showing the kettle tilted to a prone position for discharge of its content.

Referring to the drawings, FIGS. 1 and 3 there is shown a kettle 10 having a lower hemispherical portion 12 situated within an opening 13 at the top of a substantially rectangular base frame 14. The lower portion is surmounted by a cylindrical upper portion 16 which rises above the base, forming a continuation of the hemispherical lower portion, and is bounded at its upper edge by a rim 18, which defines the open top of the kettle. The lower portion is jacketed for steam heating. At about the junction of the hemispherical and cylindrical portions of the kettle, there is a ring 20 which completely surrounds the kettle and is adapted by engagement with a flange 21, surrounding the opening 13, to prevent the kettle from spilling into the opening. At one side of the kettle, as shown in FIG. 2, the ring 20 is attached, for example, by welding to a horizontally disposed shaft 22, the ends of which are journaled in upstanding, laterally-spaced ears 24, fastened to an angle bar 26 welded or otherwise secured to the base at the top along the front edge. The kettle is thus supported for tilting movement from an upright position, such as shown in FIGS. 1 and 3, which is the position it would occupy during processing of food upwardly to a prone position, such as shown in FIG. 4, for discharging its content.

In accordance with one aspect of the invention, there is a cradle 28 mounted on the base at that side toward which the kettle is to be tilted for discharge, for supporting a tray 30, shown in dot and dash lines, for receiving the content of the kettle or a portion thereof. The cradle, as shown in FIG. 2, is U-shaped having a horizontal rail 30 which is parallel to the shaft 22 and laterally spaced, forwardly extending rails 32—32 at its ends, the upper edges of which are adapted slidably to receive the tray 30, or an equivalent receptacle, having a rim or flange at its top for engagement with the upper edges of the rails 32—32 and 30. The cradle has extending rearwardly from its side rails 32—32 short arms 34—34, which are pivotally connected to the upper ends of spaced parallel links 36—36, the lower ends of which are rigidly fastened to the shaft 22. A second pair of links 38—38 are pivotally fastened at their upper ends to the forward extremities of the rails 32—32 and at their lower ends to the forward ends of a pair of horizontally disposed links 40—40, the rear ends of which contain upwardly open notches 42—42 rotatably engaged with the shaft 22. The rails and links collectively form a four-bar linkage so that by rotating the shaft the links 36—36 are moved forwardly and downwardly, thereby moving the U-shaped cradle and the tray 30 forwardly and downwardly. Since the shaft 22 is rotated by tilting the kettle, the tray is moved in coincidence with the kettle as the latter is tilted, from the position shown in FIG. 3, to the position shown in FIG. 4, so that the content of the kettle may be discharged directly into the tray. With this arrangement, the tray can be placed on the cradle, close to the kettle, when the latter is about to be emptied, and then the content of the kettle emptied into the tray by merely tipping the kettle upwardly without having to hold or otherwise manipulate the tray and without danger of spilling or of burning the person attending the apparatus. Moreover, the tray may be removed from the cradle by sliding it forwardly without having to restore the kettle to an upright position and without having to lift the tray to clear it of the rails.

The mechanism for tilting the kettle includes a rigid arm 44 (FIGS. 3 and 4) which is pivotally secured at its lower end between a pair of spaced upstanding ears 46—46, bolted or otherwise fastened to a plate 48 at the bottom of the base, beneath the kettle. The pivot point for the lower end of the arm lies just to the right side of a perpendicular passing through the bottom of the kettle, as shown in FIG. 3. The arm 44 extends rearwardly from its pivot point along the underside of the kettle and then upwardly between the rear side of the kettle and the base, terminating when the kettle is seated within the base, just below the opening 13 through which the spherical portion of the kettle extends downwardly into the base. There are three pulleys 50, 52 and 54 on the arm, the pulley 50 being at the upper end, the pulley 52 being intermediate the ends and the pulley 54 being at the lower end of the arm. A strut 56 is welded or otherwise fastened to the lower forward side of the kettle, substantially midway between its lateral sides, FIGS. 1 and 3. A flexible element 58 is fastened to the forward extremity of the strut 56 and extends rearwardly therefrom beneath the underside of the kettle, upwardly along the rear side, over the pulley 50 at the upper end of the arm 44, from thence under the pulley 52, then around the pulley 54 at the lower end of the arm, around an idle pulley 55 and finally is wound on a drum 60. The drum 60 is fastened to the lower end of a vertically disposed shaft 62 which extends downwardly from a gear reduction unit 64. To keep the flexible element 58 in position, that is, to prevent lateral sliding on the spherical surface of the kettle, a rigid channel member 64 is fastened to the strut 56 and about the under and rear sides of the kettle, within which the flexible element 58 is confined while the kettle is in the position shown in FIG. 3. By shortening up on the flexible element, that is, by winding it on the drum 60, the arm 44 is pulled upwardly from its rearwardly inclined position to an upright position, as shown in FIG. 4, which in turn lifts the kettle out of the base and tilts it forwardly about the shaft 22 until the plane of its rim is substantially perpendicular.

Figure 5:
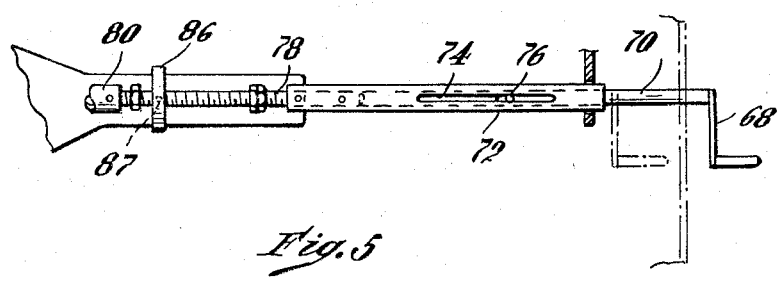
FIG. 5 is a detail of the crank mechanism for effecting tilting movement of the kettle.

The shaft 62, to which the drum is fixed, is part of the gear reduction unit 64, the latter being fastened by a suitable clamping band 66 (FIGS. 3 and 4) to the base. Rotation of the shaft is effected by means of a crank 68. As shown in FIG. 5, the crank 68 is fastened to a shaft 70 which is slidably engaged within a sleeve 72 containing a slot 74, which is adapted slidably to receive a pin 76 fixed in the shaft 70. Thus, the crank may be pulled forwardly to a position outside of the base for rotation when the kettle is to be tilted and when not in use pushed inwardly to the full line position within the base to an out-of-the-way position. The sleeve 72 is fixed to one end of a screw 78, the opposite end of which is fixed to a universal coupling 80, the latter being fastened to a shaft 82 projecting from the reduction unit. Rotation of the screw, by means of the crank, will thus produce rotation of the shaft 62. The sleeve 72 is supported near its upper end by a bracket 84 fastened to the base. The screw 78 has in it a travel limit nut 86 which is kept from turning by a pin 87 extending into a slot in a plate 88 fastened to the base.

When the kettle is filled, it is quite heavy and even though the gear reduction unit affords a considerable mechanical advantage, it is desirable to counterweight the kettle and content to some extent; accordingly, a small drum 90 is mounted on an upwardly projecting portion of the shaft 62 and on this drum there is wrapped a flexible element 92, one end of which passes about an idle pulley 93 and is fastened to one end of a strong spring 94. The opposite end of the spring is fastened to a flange 96 bolted to the base. The tension in the spring tends to rotate the drum 90 and hence the shaft 62 in a direction to elevate the arm 44 and hence to tilt the kettle upwardly about its pivot.

The kettle, as previously stated, is jacketed so as to provide a steam chamber about the lower spherical portion and steam is supplied to the chamber through a flexible conductor 98, as shown in FIG. 6, one end of which is connected to a nipple 100 in the wall of the jacket and the other end to a valve V, through which steam is supplied from a suitable source. Condensate is drained from the kettle through a flexible conduit 102, one end of which is connected to the bottom of the jacket by a nipple 104 and the other end of which is connected to a steam trap 106. The conductors 98 and 102 are made long enough so that the kettle may be tilted upwardly to its prone position for discharge without rupture as shown in FIG. 7.

It should be understood that the present disclosure is for the purpose of illustration only and that this invention includes all modifications and equivalents which fall within the scope of the appended claims.

I claim:

1. The combination with a tiltable kettle, including a base, pivotally connected bearing elements fixed to the kettle and base respectively, supporting the kettle for tilting movement from an upright position to a horizontal position, spaced parallel four-bar linkages having spaced parallel, horizontally disposed top and bottom bars and spaced parallel end bars connected at their ends to the top and bottom bars, means supporting the linkages on the frame with the bottom bars at a level corresponding to the axis of the bearing elements supporting the kettle, the top bars, below the top of the kettle, with one pair of end bars adjacent the wall of the kettle and the other pair spaced outwardly therefrom, and means connecting the one pair of end bars to the kettle so that tilting movement of the kettle imparts a corresponding tilting movement to the bars to collapse the linkages, and a tray mounted between and resting on the upper bars of the linkages, said tray being movable laterally outward and downward by the collapse of the linkages as the kettle is tilted and being maintained horizontal throughout such movement.

2. The combination with a tiltable kettle, including a base, pivotally connected bearing elements fixed to the kettle and base respectively, supporting the kettle for tilting movement from an upright position to a substantially horizontal position, spaced parallel four-bar linkages having spaced parallel, horizontally disposed top and bottom elements and spaced parallel end elements connected at their ends to the top and bottom elements, means supporting the linkages on the frame with the lower elements fixed thereto and projecting horizontally outward therefrom at a level corresponding to the axis of the bearing elements of the kettle, with one pair of end elements adjacent the kettle, and the other pair of end elements spaced therefrom and the upper horizontal elements situated below the top of the kettle, and means for affixing the lower ends of the end elements adjacent the kettle to the bearing elements on the kettle so that angular movement of the kettle imparts a corresponding angular movement of said end elements to collapse the linkages and hence to lower the upper elements while maintaining them in a horizontal plane, and a tray disposed between and resting upon the upper horizontal elements.

3. The combination with a tiltable kettle, including a base, said kettle having a lip at one side, bearing means pivotally supporting the kettle intermediate its top and bottom on the base for tilting movement from an upright position to a substantially horizontal position, supporting arms having upper and lower ends, means on the base at the side toward which the kettle is tilted, pivotally supporting the lower ends of the arms with their upper ends in a predetermined position relative to each other and to the top of the kettle, said arms being so proportioned and their centers of rotation so situated that, when moved in unison, the upper ends remain in said predetermined relation to each other throughout pivotal movement, a tray, linking arms pivotally connected to the upper ends of the supporting arms and supporting the tray in a horizontal position adjacent the top of the kettle when the kettle is in upright position, said linking arms being spaced apart and extending in a common horizontal plane and removably supporting the tray therebetween, and means connected to the arms and operable, by tilting movement of the kettle, to rotate the supporting arms in unison in consonance with the tilting of the kettle to lower the tray while maintaining it horizontally, subjacent the lip of the kettle, throughout angular tilting of the kettle.

4. The combination with a tiltable kettle, including a base, bearing means pivotally supporting the kettle intermediate its top and bottom on the base for tilting movement from an upright position to a substantially horizontal position, a tray, and tray-supporting means comprising a pair of four-bar linkages mounted on the base so as to project horizontally outward therefrom in spaced parallel planes, each linkage having vertically spaced top and bottom bars and horizontally spaced end bars, means supporting the bottom bars of each linkage in horizontal positions, means rigidly connecting an end bar of each linkage to the kettle substantially parallel to the vertical axis thereof so that movement imparted to the end bars connected to the kettle, by tilting movement of the kettle, is transmitted to the top horizontal bars and to the opposite end bars, and the tray is supported between the linkages on the upper edges of the horizontal bars.

5. The combination with a tiltable kettle, including a base, bearing means pivotally supporting the kettle on the base for tilting movement from an upright position to a substantially horizontal position, a tray, mounting means on the base mounting the tray in a horizontal plane, means connecting the kettle to the supporting means operable, as the kettle is tilted, to move the tray forwardly and downwardly while maintaining it in a horizontal plane, an arm having its upper end adjacent an intermediate portion of the kettle when the latter is in an upright position, pivotally supported at its lower end of the base, pulleys mounted on the arm, a flexible element connected at one end to the bottom of the kettle with a portion extending therefrom over the pulleys on the arms, and means connected to the other end of the flexible element for shortening that portion of the flexible element extending between the bottom of the kettle and the pulley nearest the distal end of the arm.

6. The combination with a tiltable kettle, including a base, bearing means pivotally supporting the kettle on the base for tilting movement from an upright position to a substantially horizontal position, a tray, mounting means on the base mounting the tray in a horizontal position at the side toward which the kettle is tilted, means connecting the kettle to the mounting means operable, as the kettle is tilted, to move the tray forwardly and downwardly while maintaining the tray in a horizontal plane, and means for tilting the kettle comprising an arm situated within the base beneath the kettle, means pivotally mounting the lower end of the arm on the base, said arm rising from its pivot rearwardly and upwardly along the underside of the kettle and having its upper end adjacent an intermediate portion of the kettle when the latter is in an upright position, pulleys on the ends and at an intermediate portion of the arm, a flexible element connected at one end to the bottom of the kettle with a part passing rearwardly about the bottom of the kettle over the pulley at the upper end of the arm and downwardly over the intermediate and lower pulleys, and means for shortening that portion of the flexible element between the end attached to the kettle and the lowermost pulley on the arm.

7. The combination with a tiltable kettle, including a base, bearing means pivotally supporting the kettle on the base for tilting movement from an upright position to a substantially horizontal position, a tray, mounting means on the base mounting the tray in a substantially horizontal plane at the side toward which the kettle is tilted, means connecting the kettle to the mounting means operable, as the kettle is tilted, to move the tray forwardly and downwardly while maintaining it in a horizontal plane, and means for tilting the kettle comprising an arm situated within the base beneath the kettle, means pivotally mounting the lower end of the arm on the base, said arm rising from its pivot rearwardly and upwardly along the underside of the kettle and having its upper end adjacent an intermediate portion of the kettle when the latter is in an upright position, pulleys at the ends and an intermediate portion of the arm, a flexible element connected at one end to the bottom of the kettle with a part passing rearwardly about the bottom of the kettle over the pulley at the upper end of the arm and downwardly over the intermediate and bottom pulleys, a drum upon which a portion of the element is wound, and means for effecting rotation of the drum to shorten that portion of the element between the bottom of the kettle and the pulley at the pivoted end of the arm.

8. The combination with a tiltable kettle, including a base, bearing means pivotally supporting the kettle on the base for tilting movement from an upright position to a substantially horizontal position, a tray, mounting means on the base mounting the tray in a substantially horizontal position at the side toward which the kettle is tilted, means connecting the kettle to the mounting means operable, as the kettle is tilted, to move the tray forwardly and downwardly while maintaining it in a horizontal position, and linkage for tilting the kettle including a flexible element operably connected at one end to the kettle below its pivotal support, a drum, means operably connecting the opposite end of the flexible element to the drum upon which the element is wound, shortening of the flexible element by rotation of the drum effecting operation of the linkage to lift and tilt the kettle, and means normally operating on said drum in a direction to assist in winding the element on the drum.

9. The combination with a tiltable kettle, including a base, bearing means pivotally supporting the kettle on the base for tilting movement from an upright position to a substantially horizontal position, a tray, mounting means on the base mounting the tray in a substantially horizontal position at the side toward which the kettle is tilted, means connecting the kettle to the mounting means operable, as the kettle is tilted, to move the tray forwardly and downwardly while maintaining it in a horizontal plane, linkage for tilting the kettle including a flexible element, one end of which is attached to the lower part of the kettle, a drum on which a portion of the flexible element is wound, a crank for turning the drum in a direction to take up the flexible element, and means normally exerting a force on the drum in a direction to assist in turning the drum in a direction to take up the flexible element thereon.

10. The combination with a tiltable kettle, including a base, bearing means pivotally supporting the kettle on the base for tilting movement from an upright position to a substantially horizontal position, a tray, mounting means on the base mounting the tray at the side toward which the kettle is tilted, means connecting the kettle to the mounting means operable, as the kettle is tilted, to move the tray forwardly and downwardly while maintaining it in a horizontal plane, linkage for tilting the kettle including a flexible element, one end of which is attached to the lower part of the kettle, a drum on which a portion of the flexible element is wound, a gear-reduction unit to which the drum is connected for rotation, and a crank for effecting rotation of the gear-reduction unit and hence of the drum, said crank having a telescoping part movable forwardly from the base for use and rearwardly into the base when not in use.

11. Apparatus according to claim 3, wherein the base has an opening at its top bounded by an upstanding annular rim, a downwardly open annular channel fastened to the wall of the kettle between its top and bottom, said channel member being adapted to rest over the rim to support the kettle with its lower part within the base and with its upper part above the opening, means pivotally connecting the bearings to the top of the base at one side of the opening for upward tilting movement about the pivot to lift the kettle upwardly out of the base and move it laterally so that its top portion extends beyond the side of the base in a substantially horizontal position, and means for effecting upward and lateral movement of the kettle about its pivot.

References Cited in the file of this patent

UNITED STATES PATENTS

| | | |
|---|---|---|
| 1,575,233 | Stillman | Mar. 2, 1926 |
| 1,586,571 | Mielka | June 1, 1926 |
| 2,201,634 | Shurts | May 21, 1940 |
| 2,674,180 | Ekman | Apr. 6, 1954 |
| 2,678,188 | Rogers | May 11, 1954 |
| 2,734,515 | Campbell | Feb. 14, 1956 |
| 2,883,123 | Finnigan | Apr. 21, 1959 |
| 2,949,290 | Hezler | Aug. 16, 1960 |

FOREIGN PATENTS

| | | |
|---|---|---|
| 144,017 | Germany | Oct. 29, 1903 |
| 806,771 | Germany | June 18, 1951 |